(12) United States Patent
Gomez et al.

(10) Patent No.: US 8,111,183 B2
(45) Date of Patent: *Feb. 7, 2012

(54) SYSTEMS AND METHODS FOR DIGITAL UPCONVERSION FOR DIGITAL SIGNALS

(75) Inventors: Ramon A. Gomez, San Juan Capistrano, CA (US); Donald McMullin, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/805,474

(22) Filed: Aug. 2, 2010

(65) Prior Publication Data

US 2010/0296573 A1 Nov. 25, 2010

Related U.S. Application Data

(63) Continuation of application No. 10/826,281, filed on Apr. 19, 2004, now Pat. No. 7,768,434, which is a continuation of application No. 10/452,211, filed on Jun. 3, 2003, now Pat. No. 6,724,335.

(51) Int. Cl.
*H03M 1/66* (2006.01)
(52) U.S. Cl. .......................... 341/144; 455/112; 455/118
(58) Field of Classification Search .................. 341/144; 455/112, 118, 3.01; 348/725; 331/18
See application file for complete search history.

(56) References Cited

U.S. PATENT DOCUMENTS

| | | | |
|---|---|---|---|
| 5,553,064 A | 9/1996 | Paff et al. | |
| 5,682,195 A | 10/1997 | Hendricks et al. | |
| 6,249,189 B1 | 6/2001 | Wu et al. | |
| 6,308,266 B1 | 10/2001 | Freeman | |
| 6,317,849 B1 | 11/2001 | Patel | |
| 6,473,593 B1 | 10/2002 | Groff | |
| 6,484,262 B1 | 11/2002 | Herzi | |
| 6,545,728 B1 | 4/2003 | Patel et al. | |
| 6,577,734 B1 | 6/2003 | Etzel et al. | |
| 6,760,752 B1 | 7/2004 | Liu et al. | |
| 6,810,479 B1 | 10/2004 | Barlow et al. | |
| 6,981,138 B2 | 12/2005 | Douceur et al. | |
| 6,981,156 B1 | 12/2005 | Stern et al. | |

(Continued)

FOREIGN PATENT DOCUMENTS

WO   WO 01/47261 A   6/2001

OTHER PUBLICATIONS

"Datasheet of Digital Upconverter AD9860 from Analog Devices," published on Dec. 21, 2002, retrieved from http://www.analog.com/static/imported-files/data_sheets/AD9860_9862.pfd on Feb. 19, 2009; 32 Pages.

(Continued)

*Primary Examiner* — Jean Jeanglaude
(74) *Attorney, Agent, or Firm* — Sterne, Kessler, Goldstein & Fox P.L.L.C.

(57) ABSTRACT

Systems and methods for digital upconversion of digital signals are provided. In one embodiment, the system includes a digital frequency adjustment system and a digital to analog conversion system. In a feature of the embodiment, the digital frequency adjustment system consists of set of digital upconversion and upsample elements that shift upwards the frequency of baseband signals. In a further feature of the embodiment, a tree structure of sets of upsample and upconversion elements is used. In another embodiment, the system includes digital and analog frequency adjustment systems in which the frequencies of the input signals are partially upshifted within both the digital and analog domains. Methods for digital upconversion of digital signals are also provided.

24 Claims, 10 Drawing Sheets

U.S. PATENT DOCUMENTS

| | | |
|---|---|---|
| 7,200,868 B2 | 4/2007 | Mattox et al. |
| 2002/0104006 A1 | 8/2002 | Boate et al. |
| 2002/0150169 A1 | 10/2002 | Kishi |
| 2002/0187810 A1 | 12/2002 | Dajer et al. |
| 2004/0158708 A1 | 8/2004 | Peyravian et al. |
| 2004/0210756 A1 | 10/2004 | Mowers et al. |

OTHER PUBLICATIONS

Texas Instruments, "16-Bit, 500 MSPS, 2x-6x Interpolating Dual-Channel CommsDAC™ Digital-to-Analog Converter," DAC5686, SLWS147—Apr. 2003.

EP Search Report for EP Patent Application No. EP 04 01 2918, dated Mar. 13, 2009, 6 Pages.

SYSTEMS AND METHODS FOR DIGITAL UPCONVERSION FOR DIGITAL SIGNALS

CROSS REFERENCE TO RELATED APPLICATIONS

This application is a continuation of U.S. application Ser. No. 10/826,281, filed Apr. 19, 2004, which in turn is a continuation of U.S. application Ser. No. 10/452,221, filed Jun. 3, 2003, which issued as U.S. Pat. No. 6,724,335 on Apr. 20, 2004. U.S. application Ser. Nos. 10/826,281 and 10/452,221 are hereby incorporated by reference in their entireties.

BACKGROUND OF THE INVENTION

1. Field of the Invention

The present invention relates to digital communications signals, and more particularly, to upconversion of digital signals.

2. Background of the Invention

Cable television systems generally require a conversion system for frequency converting the transmitted channels from baseband frequencies to their designated RF frequencies for transmission over the cable medium. This system is typically part of a cable television (CATV) headend system, where the composite, multi-channel CATV signal is generated and amplified for distribution to customers.

Within existing headend systems, each frequency converters typically use multiple analog mixing stages, with one or more analog phase-locked loops (PLL) to generate the local oscillators. One converter is required for each channel, and there can be more than one hundred channels in a typical CATV system. These systems are often costly and require significant amounts of hardware. Additionally within existing systems, control of signal amplitude for each channel can be complex.

What is needed is a cost-effective system and method for frequency converting baseband television signals and creating composite, multi-channel CATV signals within a CATV headend system.

SUMMARY OF THE INVENTION

The invention is directed to systems and methods for digital upconversion of baseband television signals and other types of signals, such as those associated with cable modems, that can be used in cable television headend systems. In one embodiment, the digital headend upconversion system includes a demultiplexer, a digital frequency adjustment system and a digital to analog (DAC) conversion system. In one embodiment the digital frequency adjustment system includes a set of upsample and upconversion elements that shift upwards the frequency of baseband signals. In another embodiment, a tree structure of sets of upsample and upconversion elements is used. The digital to analog conversion system includes a single digital to analog converter or a set of converters.

An alternative embodiment of the digital headend upconversion system is a digital hybrid headend upconversion system that includes a demultiplexer, a digital frequency adjustment system and an analog frequency adjustment system. In this embodiment, the frequencies of baseband signals that are input to the upconversion system are partially upshifted within the digital domain and partially upshifted within the analog domain. The digital frequency adjustment system is as described above, except that the frequencies of the baseband signals are partially adjusted rather than upshifted to final desired frequencies for distribution. The analog frequency adjustment system includes a set of digital to analog converters followed by a set of band pass filters, followed by a set of mixers, followed by another set of band pass filters, followed by another set of mixers, and finally followed by a set of low pass filters. The outputs of each of the low pass filters are summed together to form the desired frequency upconverted composite signal for distribution throughout a cable network. In a further feature, within a digital or digital hybrid upconversion system, an individual channel gain adjustment system can be included to allow precise gain adjustment controls for individual channels.

Methods for digital upconversion of television signals are also provided. In one embodiment, the method includes receiving digital baseband television signals, demuxing those signals, upsampling and upconverting the demuxed signals, then recombining the signals and performing a digital to analog conversion. In one embodiment, upsampling and upconverting the demuxed signals occurs in a two steps. In alternative embodiments, a tree structure of upsampling and upconversion elements in used, such that upsampling and upconverting occurs in multiple two-step phases.

In another embodiment, the frequencies of digital input signals are partially upshifted within the digital domain and partially upshifted within the analog domain.

Use of the invention provides two principal benefits. First, use of the invention reduces the cost and complexity of hardware needed for a cable television headend system. Second, use of the invention simplifies digital control of channel amplitude for the television signals.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
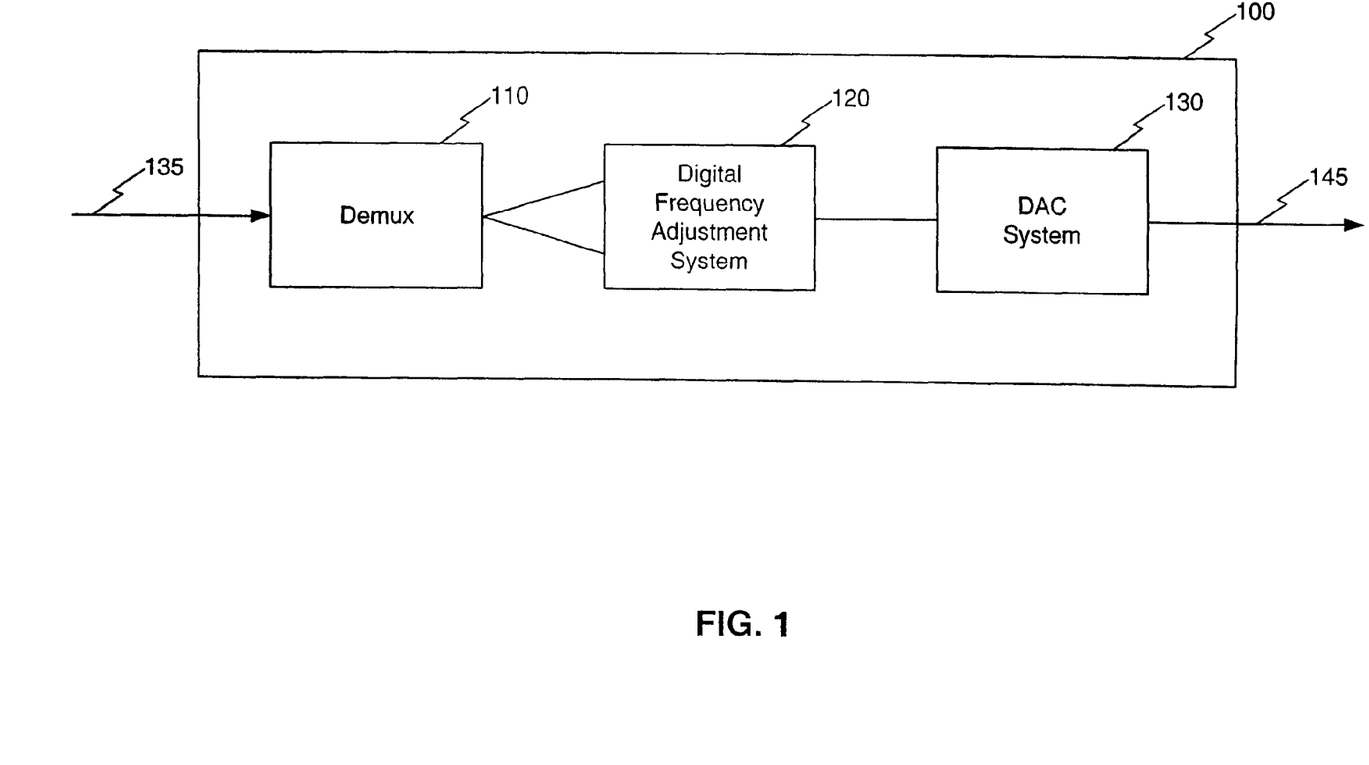
FIG. 1 is a diagram of a digital headend upconversion system, according to an embodiment of the invention.

FIG. 1 illustrates digital headend upconversion system 100, according to an embodiment of the invention. Digital headend upconversion system 100 includes demultiplexer 110, digital frequency adjustment system 120 and digital to analog converter (DAC) system 130. An input signal is provided to digital headend upconversion system 100 over connection 135, and an output signal is transmitted from digital headend upconversion system over connection 145. Digital headend upconversion system 100 can be used within a cable television headend system. When used within a cable television headend system, inputs into demultiplexer 110 are multiple baseband television channels in a digital format. The outputs of demultiplexer 110 are coupled to the input of digital frequency adjustment system 120, and the outputs of digital frequency adjustment system 120 are coupled to the input of DAC system 130, which transmits its output over connection 145.

In an alternate embodiment of digital headend upconversion system 100, demultiplexed signals are provided to the system, so that demultiplexer 110 is not required. In another alternate embodiment of digital headend upconversion system 100, a individual channel gain adjustment system can be coupled to either the output of demultiplexer 110 or to the output of digital frequency adjustment system 120. Use of an individual channel gain adjustment system allows individual channel gains to be scaled digitally which is more precise and less prone to drift than current analog approaches.

Digital headend upconversion system 100 converts digital baseband television signals to an analog signal in which the digital baseband television signals have been upconverted in frequency to the desired radio frequency (RF) frequencies to create a multi-channel RF spectrum. This output, or multi-channel RF spectrum, can then be distributed over a cable television distribution system to individual cable subscribers.

Figure 2:
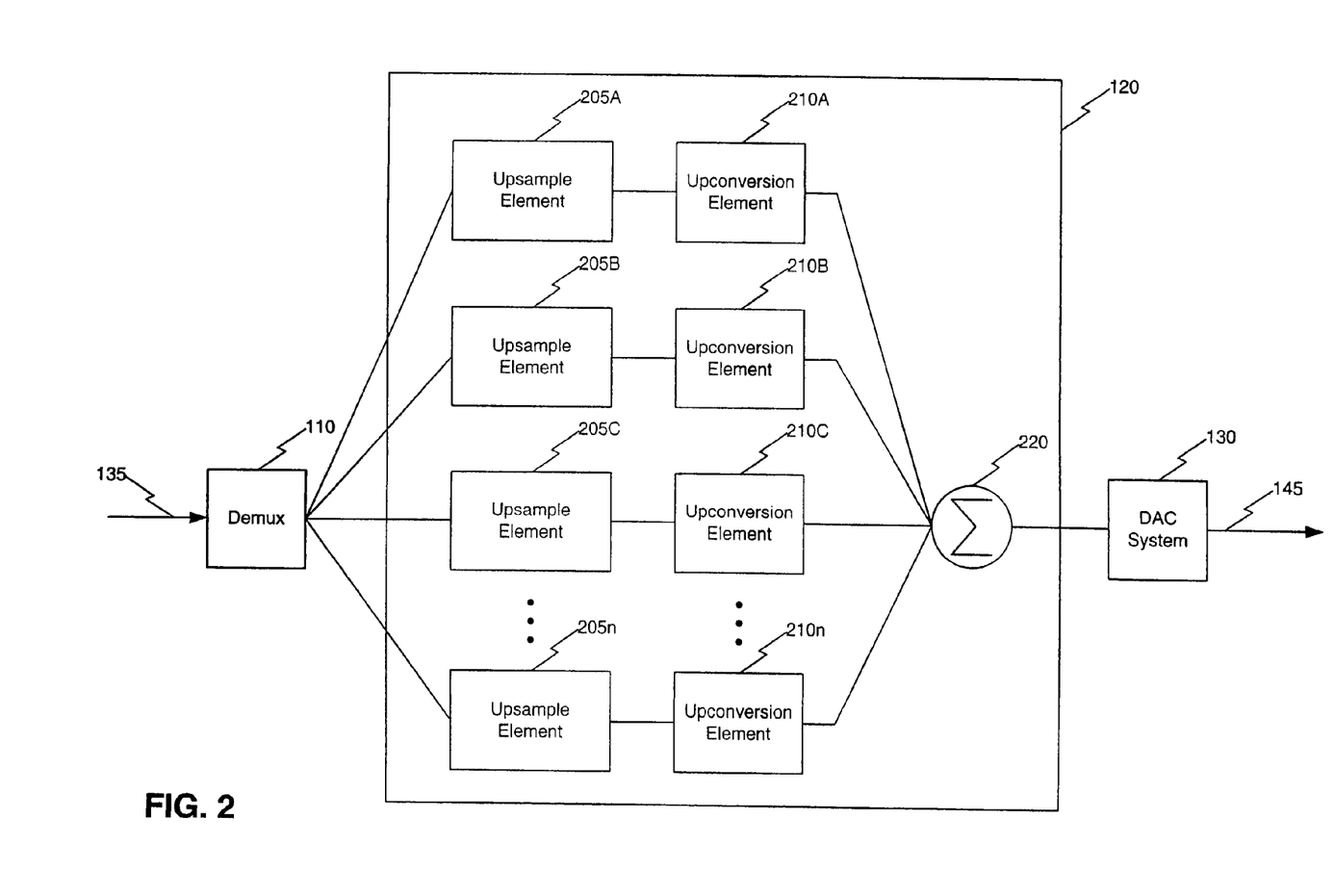
FIG. 2 is a diagram of a digital frequency adjustment system, according to an embodiment of the invention.

Digital frequency adjustment system 120 can be implemented in a number of alternative embodiments. FIG. 2 is a diagram of digital frequency adjustment system 120, according to one embodiment of the invention. In this embodiment, digital frequency adjustment system 120 includes upsample elements 205A, B, C, and n; upconversion elements 210A, B, C, and n; and a summing device 220.

As discussed with respect to FIG. 1, digital baseband television signals can be input to demultiplexer 110. Demultiplexer 110 provides a set of output signals to an array of upsample elements 205A, 205B, 205C through 205n, such that each of the baseband signals outputted from demultiplexer 110 is transmitted to an upsample element that will upsample the baseband signal. The number of upsample elements 205 used will be a function of the number of baseband channels to be upconverted. The upsample elements interpolate intermediate data points between signal points, and add those to the signal to facilitate less complex digital to analog conversion.

Outputs from the upsample elements 205A, B, C and n are coupled to the inputs of upconversion elements 210A, B, C or n. As discussed below with respect to FIG. 6, the design of each of upconversion elements 210 is the same, except for their operating frequencies. Each upconversion element 210 will be coupled to one upsample element 205. For example, upsample element 205A is coupled to upconversion element 210A, upsample element 205B is coupled to upconversion element 210B, upsample element 205C is coupled to upconversion element 210C and so forth, such that upsample element 205n is coupled to upconversion element 210n. The outputs from all of the upconversion elements 210 are coupled to summing device 220. Summing device 220 combines these signals to output an upconverted digital signal. The output of summing device 220 is then coupled to the input of DAC system 130. As can be observed in FIG. 1, the signals traversing digital frequency adjustment system 120, remain in digital form and therefore enable significant digital control of channel amplitudes.

Figure 3:
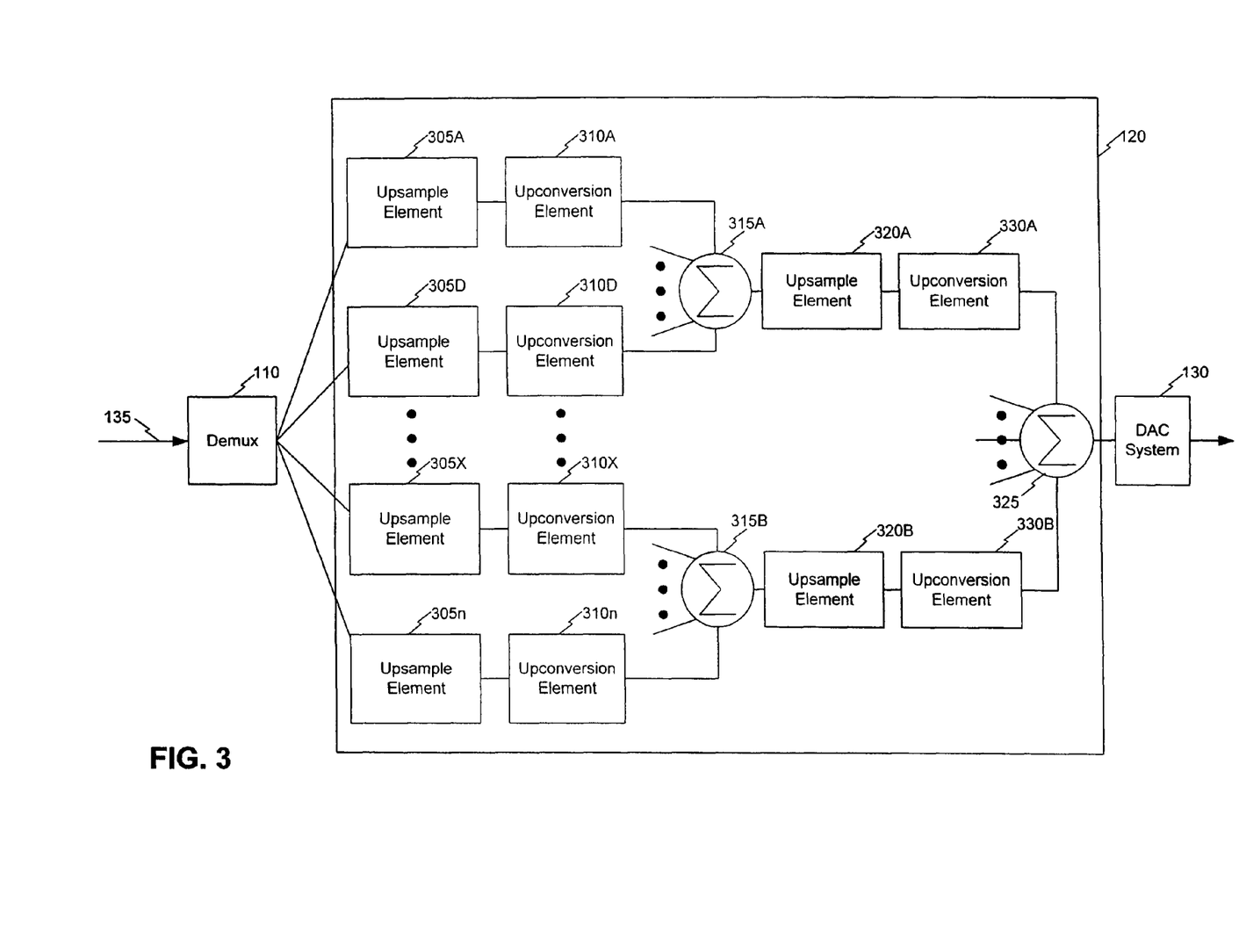
FIG. 3 is a diagram of a digital frequency adjustment system that includes cascading upsample and upconversion elements, according to an embodiment of the invention.

FIG. 3 provides an alternative embodiment of digital frequency adjustment system 120, according to an embodiment of the invention. In this embodiment, the upsampling and upconverting is carried out in a tree structure or series of upsampling and upconverting steps to minimize component complexity. In this case, digital frequency adjustment system 120 includes a first set of upsample elements 305A, 305D, 305X and 305n; a first set of upconversion elements 310A, 310D, 310X, and 310n; a first set of summing devices 315A and 315B; a second set of upsample elements 320A and 320B; and a second set of upconversion elements 330A and 330B; and a summing device 325. As in the embodiment depicted in FIG. 2, the number of upsample elements within the first set of upsample elements will be a factor of the number of baseband channels, and the number of steps within the tree structure.

As in the previous case, demultiplexer 110 provides a set of output signals to an array of upsample elements 305A, 305D, 305X through 305n, such that each of the baseband signals output from demultiplexer 110 is transmitted to an upsample element. Outputs from upsample elements 305A, D, X and n are coupled to the inputs of upconversion elements 310A, D, X and n that will upconvert the baseband signal to a desired RF frequency. Each upconversion element 310 will be coupled to one upsample element 305.

Up until this point, the embodiment described with respect to FIG. 3 appears the same as the embodiment described with respect to FIG. 2. At this point, however, the embodiments differ. Rather than having the outputs from the upconversion elements coupled to a single summing device, as was the case with respect to the embodiment depicted in FIG. 2, the outputs from the upsample elements are coupled to two summing devices. More precisely, the outputs of upconversion element 310A through 310D are coupled to summing device 315A and the outputs of upconversion elements 310X through 310n are coupled to summing device 315B. The output from summing device 315A is then coupled to the input of upsample element 320A, while the output from summing device 315B is coupled to upsample element 320B. The outputs of the second set of upsample elements—upsample elements 320A and 320B—are then coupled to the inputs of upconversion elements 330A and 330B. The outputs from upconversion elements 330A and 330B are coupled to summing device 325. Summing device 325 combines these signals to output an upconverted digital signal. The output of summing device 325 is then coupled to the input of DAC system 130.

The embodiment depicted in FIG. 3 provides a tree structure of upsample and upconversion elements in which two sets of upsample and upconversion elements are used. The description of this embodiment is illustrative, and not intended to limit the invention to a tree structure having only two sets of upsample and upconversion elements. Rather, any number of sets of upsample and upconversion elements within the tree structure can be used. The number of sets to be used will be a tradeoff between reducing the complexity of individual upsample and upconversion elements by having a greater number of upsample and upconversion elements, and the complexity of having an increasing number of upsample and upconversion elements, and summing devices. The number of baseband signals being converted will factor into the number of sets within a tree structure to be used. Based on the teachings herein, individuals skilled in the art can select the appropriate number of sets of upsample and upconversion elements based on their particular application.

Figure 4A:
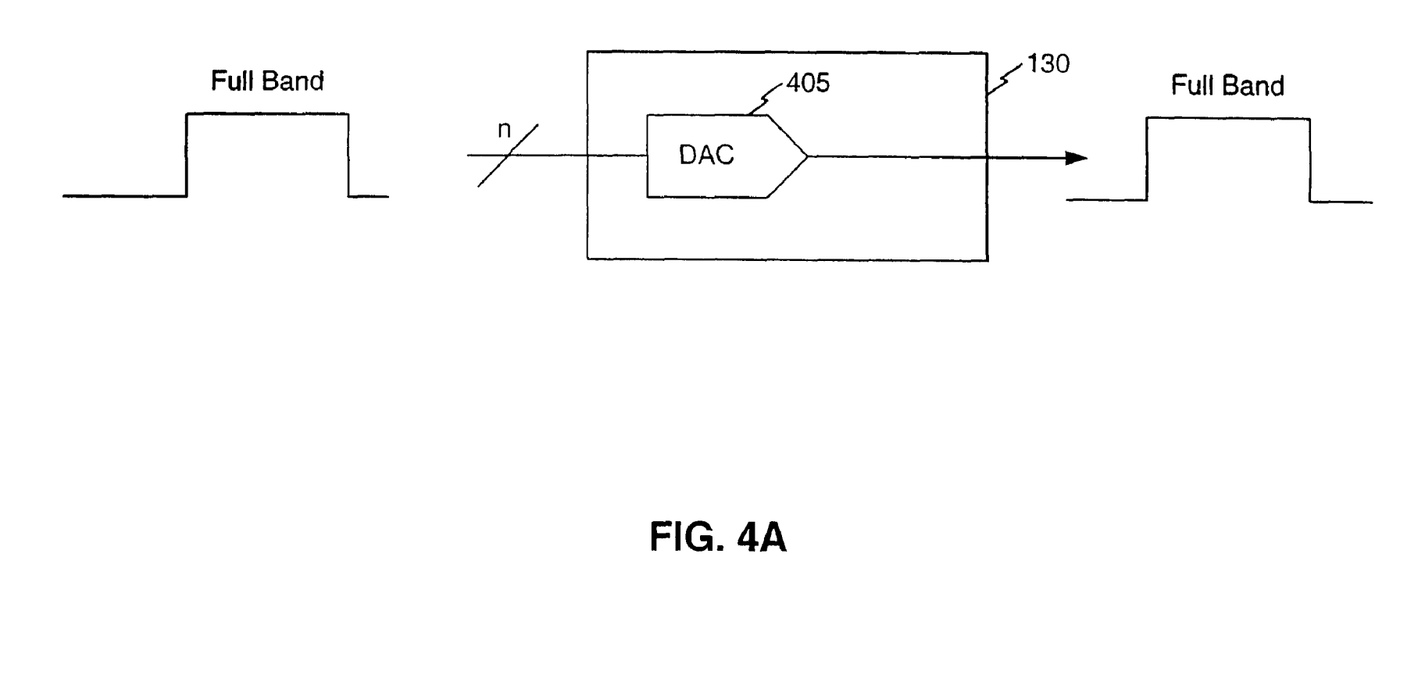
FIG. 4A is a diagram of a digital to analog converter system, according to an embodiment of the invention.

Alternative embodiments of DAC system 130 can also be used within the invention. In one embodiment, a single digital to analog converter can be used within DAC system 120. Alternatively, a series of digital to analog converters can be used. FIG. 4A illustrates the embodiment in which a single digital to analog converter 405 is used. In this embodiment, the output from digital frequency adjustment system 120 is coupled to the input of digital to analog converter 405. The output of digital to analog converter 405 is then provided for distribution through a cable television network.

Figure 4B:
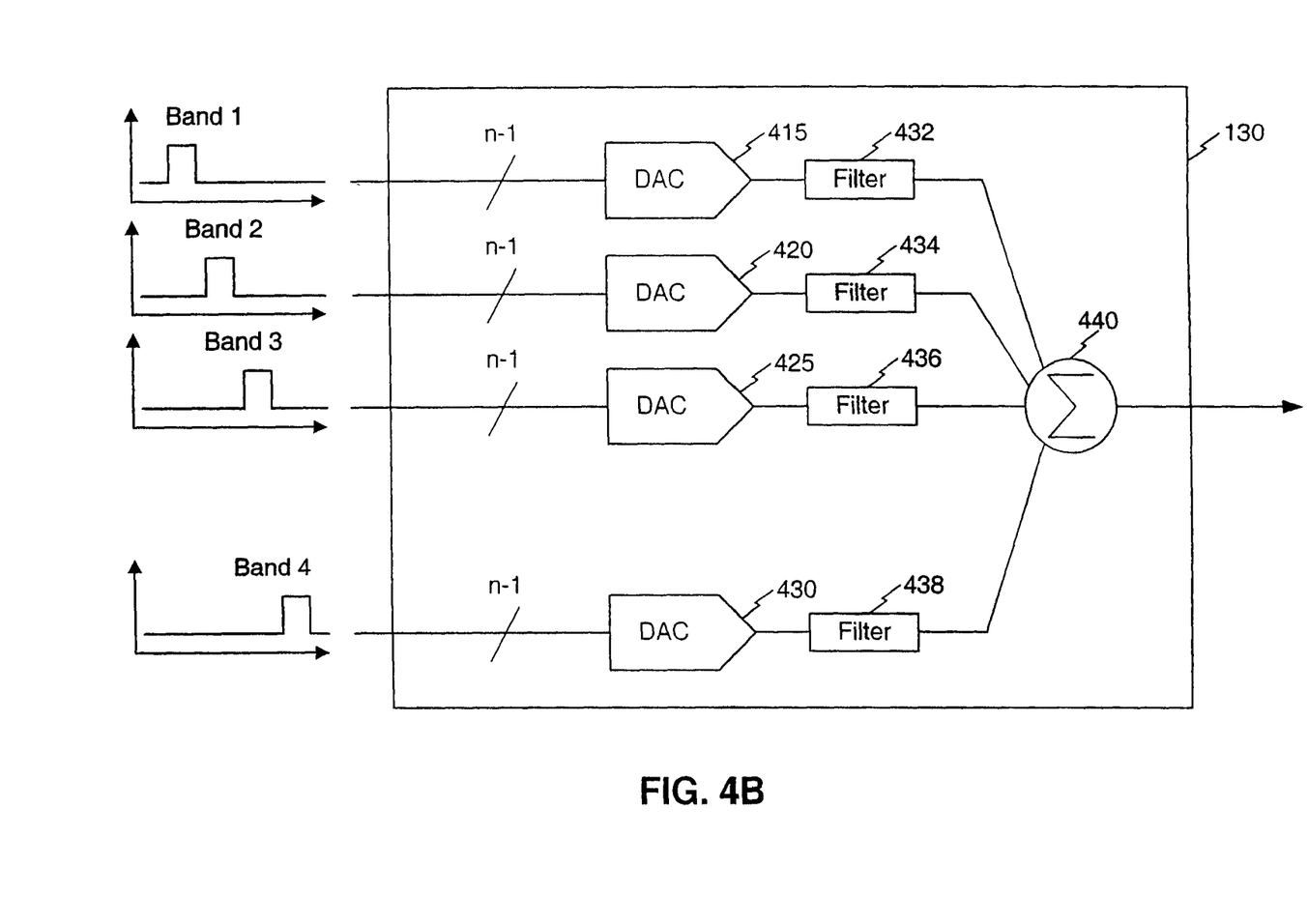
FIG. 4B is a diagram of a digital to analog converter system that includes a series of digital to analog converters, according to an embodiment of the invention.

FIG. 4B illustrates an embodiment in which multiple digital to analog converters are used. In this case, DACs 415, 420, 425 and 430 are used. In the embodiment depicted in FIG. 4B, DAC 415 processes signal band 1, DAC 420 processes signal band 2, DAC 425 processes signal band 3, and DAC 425 processes signal band 4. The outputs of each of DACs 415, 420, 425 and 430 are then coupled to the inputs of filters 432, 434, 436 and 438. Filters 432, 434, 436 and 438 will be a combination of lowpass, bandpass, and high-pass filters depending on the particular frequency to be processed. The use of the filters reduces the complexity of the digital to analog converters. In other embodiments, filters may not be used. The filter outputs are combined by summing device 440 to generate an output signal. By using parallel DACs, the resolution requirement of an individual DAC is reduced. Specifically, for each factor of four increase in the number of DACs, one less bit of resolution is necessary. Thus, while additional hardware is needed, the complexity of that hardware is reduced. The number of parallel DACs may range from 2 to the number of bands within the baseband television signal.

Figure 5A:
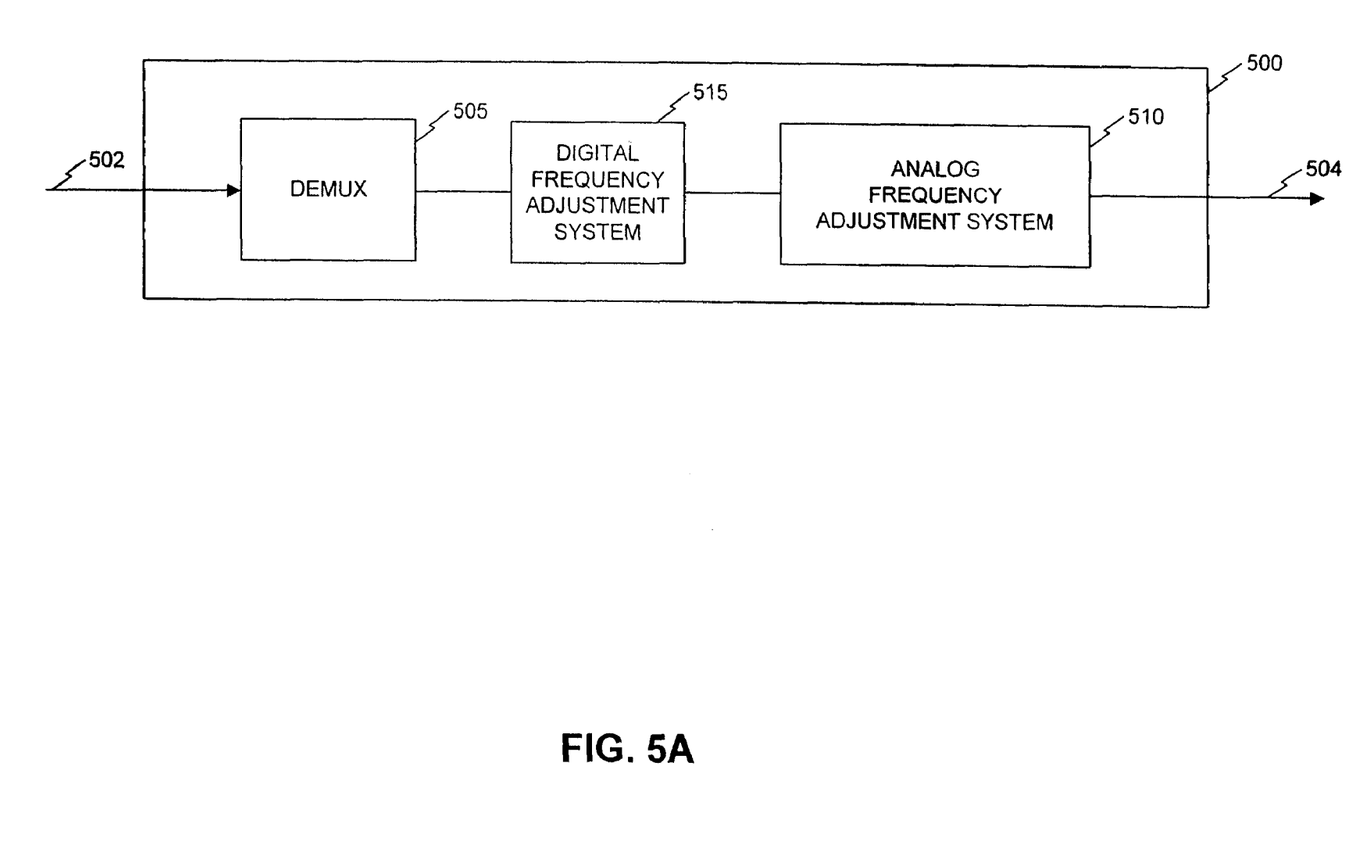
FIG. 5A is a diagram of a digital hybrid headend upconversion system, according an embodiment of the invention.

FIG. 5A is a diagram of digital hybrid headend upconversion system 500, according to an embodiment of the invention. As in the case of digital headend upconversion system 100, digital hybrid headend upconversion system 500 converts digital baseband television signals to an analog signal in which the digital baseband television signals have been upconverted in frequency to the desired RF frequencies to create a multi-channel RF spectrum. This output, or multi-channel RF spectrum, can then be distributed over a cable television distribution system to individual cable subscribers.

Digital hybrid headend upconversion system 500 includes demultiplexer 505, digital frequency adjustment system 515 and analog frequency adjustment system 510. Digital hybrid headend upconversion system 500 represents a hybrid system in which a portion of the frequency adjustment occurs within the digital domain and a portion occurs within the analog domain.

An input signal is provided to digital hybrid headend upconversion system 500 over connection 502, and an output signal is transmitted from digital headend upconversion system over connection 504. Digital hybrid headend upconversion system 500 can be used within a cable television headend system. When used within a cable television headend system, inputs into demultiplexer 110 are multiple baseband television channels in a digital format. The outputs of demultiplexer 110 are coupled to the input of digital frequency adjustment system 515. The outputs of digital frequency adjustment system 515 are coupled to the inputs of analog frequency adjustment system 510, and the outputs of analog frequency adjustment system 510 are transmitted over connection 504. In an alternate embodiment of digital hybrid headend upconversion system 500, demultiplexed signals are provided to the system and demultiplexer 505 is not required.

Digital frequency adjustment system 515 operates under the same principles as described with respect to frequency adjustment system 120 with either a single set of upsample and upconversion elements or multiple sets of upsample and upconversion elements in a tree structure. The differences between digital frequency adjustment system 515 and digital frequency adjustment system 120 are that (1) digital frequency adjustment system 515 will not adjust the channel frequencies to the final desired channel frequencies and (2) digital frequency adjustment system 515 can provide multiple outputs.

Thus, for example, digital frequency adjustment system 515 can be the same as digital frequency adjustment system 120 as depicted in FIG. 3, except that summing device 325 would not be used, and the outputs from upconversion elements 330A and 330B would be coupled to the inputs of analog frequency adjustment system 510. Digital frequency adjustment system 515 can have one set of upsample and upconversion elements, or multiple sets. Additionally, whereas the upsample and upconversion elements in FIG. 3 were selected to upconvert the channel frequencies to the desired level for distribution within a cable network, the upsample and upconversion elements used within digital frequency adjustment system 515 can be selected to upconvert the signals to two-thirds (or some other fraction) of the final desired frequencies. The decision on how much frequency upconverting will be done by each system is a design decision based on the particular application, and a cost-benefit analysis of using upsample and upconversion elements versus using digital to analog converters within analog frequency adjustment system 510.

Figure 5B:
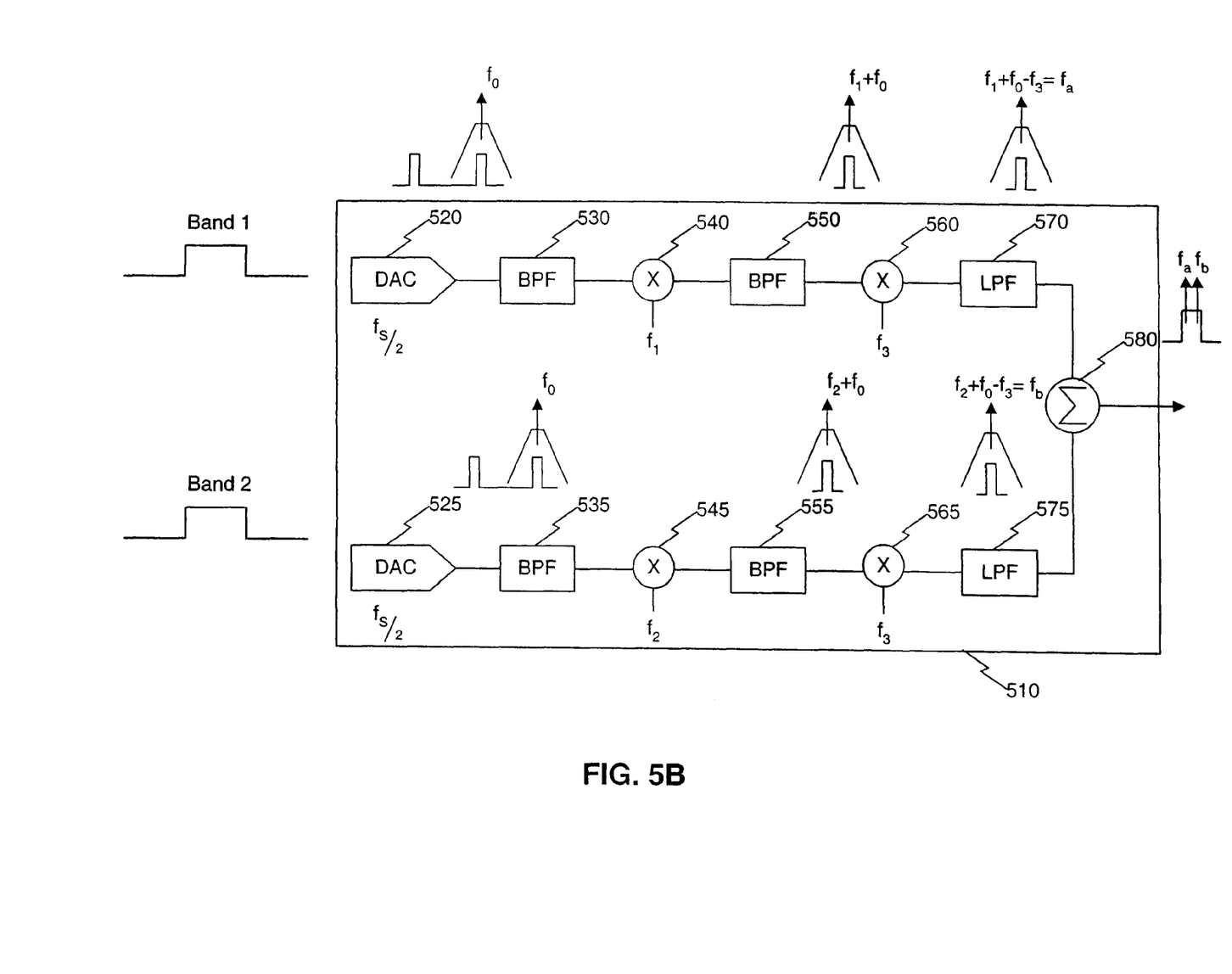
FIG. 5B is a diagram of an analog frequency adjustment system, according to an embodiment of the invention.

FIG. 5B is a diagram of an analog frequency adjustment system 510, according to an embodiment of the invention. Analog frequency adjustment system 510 includes DACs 520 and 525; band pass filters (BPF) 530, 535, 550 and 555; mixers 540, 545, 560 and 565; low pass filters (LPF) 570 and 575; and summing device 580. In this embodiment, two upconversion processing paths are formed for a band 1 and a band 2 of the input signal. Band 1 and band 2 represent non-overlapping spectrum bands (e.g., band 1 could be one half of the cable television channels and band 2 could be the other half) of the input signal. The band 1 upconversion processing path includes DAC 520, BPF 530, mixer 540, BPF 550, mixer 560 and LPF 570. Similarly, band 2 upconversion processing path includes DAC 525, BPF 535, mixer 545, BPF 555, mixer 565 and LPF 575. The processing of these two bands is the same, except for the center frequency to which each of band 1 and band 2 will be upconverted.

Along the band 1 upconversion processing path, the signal from which band 1 is to be upconverted is input into DAC 520. The output of DAC 520 is coupled to the input of BPF 530. The output of BPF 530 is band 1 upconverted to a center frequency of $f_0$ to provide a set of first intermediate signals. The output of BPF 530 is coupled to the input of mixer 540, which has a frequency of $f_1$ to provide a set of second intermediate signals. The output of mixer 540 is coupled to the input of BPF 550. The output of BPF 550 is the band 1 signal upconverted to a center frequency of $f_1+f_0$ to produce a set of third intermediate signals. The output of BPF 550 is coupled to the input of mixer 560, which has a frequency of $f_3$. The output of mixer 560 is coupled to LPF 570. The output of LPF 570 is the band 1 signal converted to a frequency of $f_1+f_0-f_3=f_a$.

Similarly, along the band 2 upconversion processing path, the signal from which band 2 is to be upconverted is input into DAC 525. The output of DAC 525 is coupled to the input of BPF 535. The output of BPF 535 is band 2 upconverted to a center frequency of $f_0$. The output of BPF 535 is coupled to the input of mixer 545, which has a frequency of $f_2$. The output of mixer 545 is coupled to the input of BPF 555. The output of BPF 555 is the band 2 signal upconverted to a center frequency of $f_2+f_0$. The output of BPF 555 is coupled to the input of mixer 565, which has a frequency of $f_3$. The output of mixer 565 is coupled to LPF 575. The output of LPF 575 is the band 2 signal converted to a frequency of $f_2+f_0-f_3=f_b$.

The outputs of the band 1 upconversion processing path and band 2 upconversion processing path are coupled to the input of summing device 580. Summing device 580 combines the signals from band 1 and band 2 upconversion processing path to produce an output signal that consists of the combination of the band 1 signal with a center frequency of $f_a$ and the band 2 signal with a center frequency of $f_b$.

Figure 6:
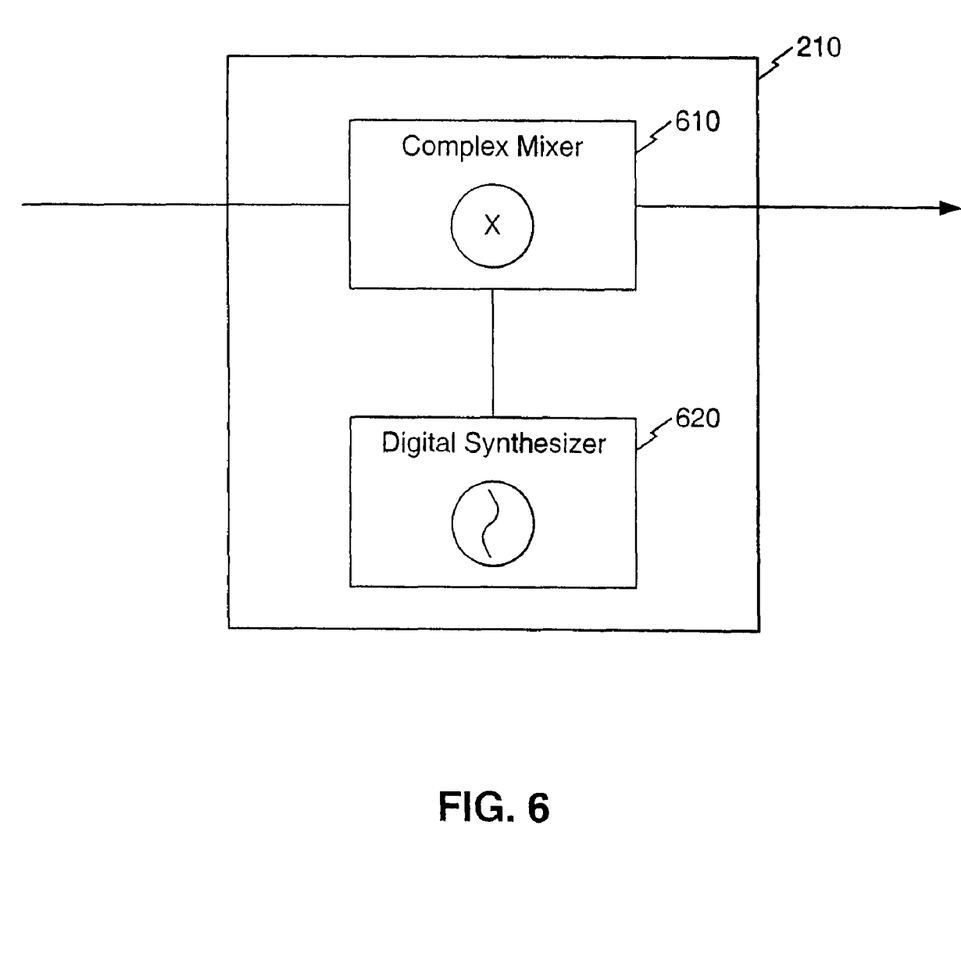
FIG. 6 is a diagram of an upconversion element, according to an embodiment of the invention.

FIG. 6 is a diagram of an upconversion element 210, according to an embodiment of the invention. Upconversion element 210 consists of a complex mixer 610 and a digital synthesizer 620. Digital synthesizer 620 is coupled to complex mixer 610, such that when an input signal is received by complex mixer 610 the frequency can be upconverted using the frequency provided by digital synthesizer 620. The upconverted signal is then output from complex mixer 610. In some cases, upconversion element 210 can have a transfer function of 1, that is, the frequency of the signal output is the same as the frequency of the signal input.

Figure 7:
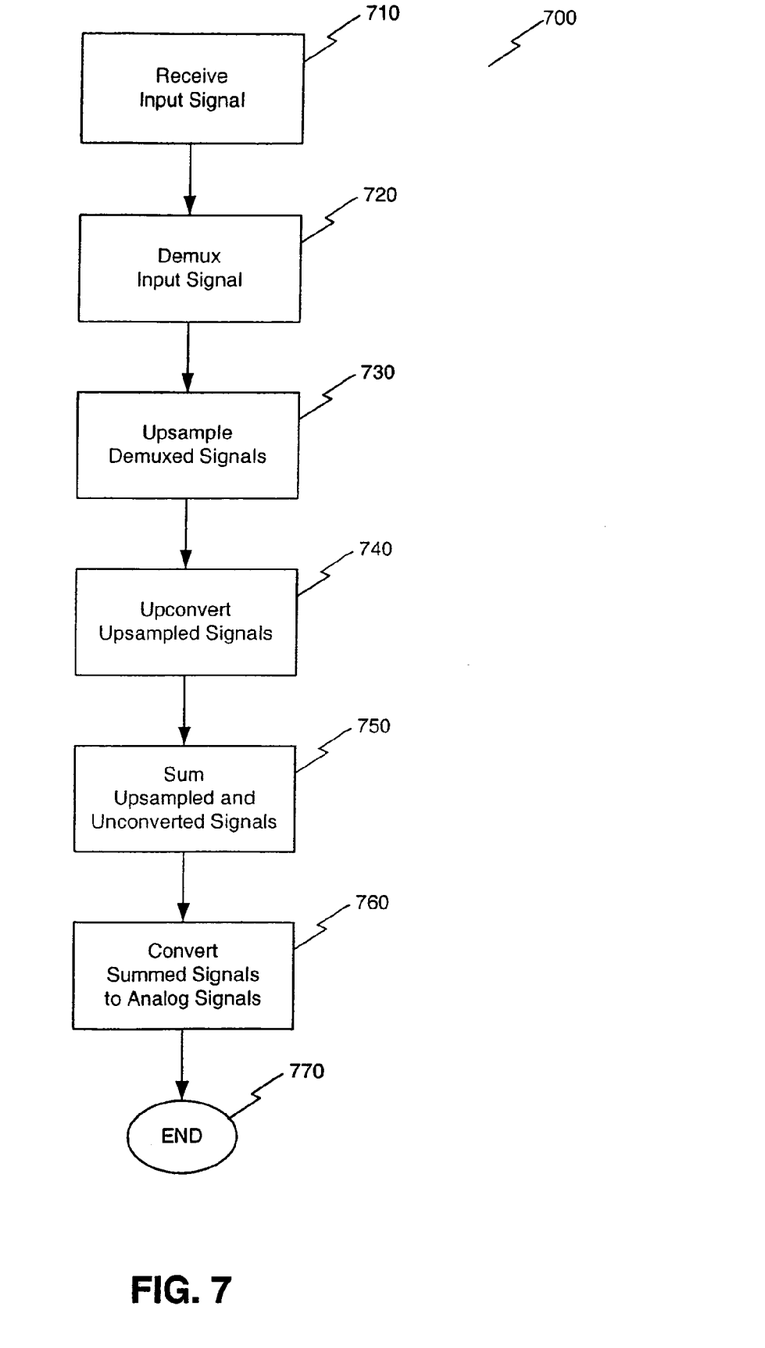
FIG. 7 is a method for digital upconversion of baseband television signals, according to an embodiment of the invention.

FIG. 7 is a method 700 for digital upconversion of baseband television signals, according to an embodiment of the invention. Method 700 begins in step 710. In step 710, a digital baseband television signal is received. In step 720, the received digital baseband television signal is demultiplexed into multiple channels or bands. In step 730, the demuxed signals are upsampled in frequency. In step 740, the demuxed signals that have been upsampled are then upconverted. In step 750, the signals produced in step 740 are summed together to create a single upconverted digital signal. In step 760, the digital upconverted signal is converted to an analog signal that can be transmitted over a cable distribution network to individual subscribers. In step 770, method 700 ends.

In an alternative embodiment, steps 730, 740, and 750 can serially be repeated multiple times. When they are repeated the frequency will be adjusted only a portion of the desired adjustment on each repeated cycle of these three steps. If these steps are repeated, in step 750, the upsampled and upconverted signals are combined together to produce two or more composite signals until these series of steps are repeated for the last time. The last time the steps are repeated, step 750 should produce a single combined single. In step 760 this signal would then be converted to an analog signal.

Figure 8:
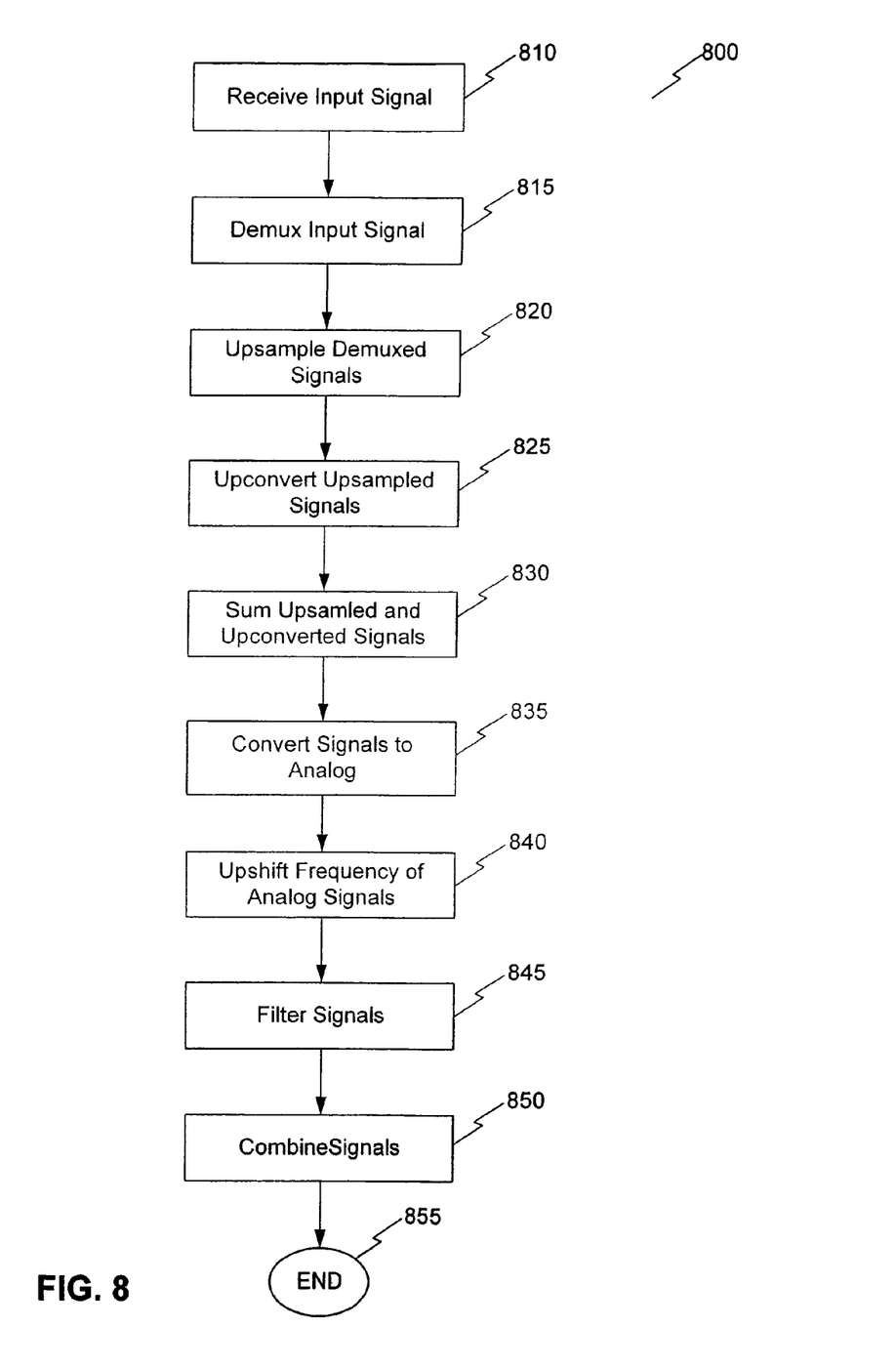
FIG. 8 is a method for digital hybrid upconversion of baseband television signals, according to an embodiment of the invention.

FIG. 8 is a method 800 for digital upconversion of baseband television signals, according to an embodiment of the invention. Method 800 begins in step 810. In step 810, a digital baseband television signal is received. In step 815, the received digital baseband television signal is demultiplexed. In step 820, the demuxed signals are upsampled in frequency. In step 825, the demuxed signals that have been upsampled are then upconverted. In step 830, the signals produced in step 825 are summed together to create at least two bands containing upconverted digital signals. In step 835, the bands containing upconverted digital signals are converted to analog signals. In step 840, the analog signals are upconverted in frequency within the analog domain. In step 845, the upconverted analog signals are filtered to extract the desired frequency bands. Steps 840 and 845 can be repeated to upconvert the frequency in multiple steps, instead of using a single upconversion. In step 850, the extracted frequency bands are combined to create an analog signal for transmission within a cable television system. In step 870, method 800 ends.

In an alternative embodiment, steps 820, 825 and 830 can serially be repeated multiple times. When they are repeated the frequency will be adjusted only a portion of the desired adjustment on each repeated cycle of these three steps. If these steps are repeated, in step 830, the upsampled and upconverted signals are combined together to produce two or more composite signals. In step 840 outputs produced in step 830 would be converted to analog signals.

Exemplary embodiments of digital headend conversion systems and methods that can be used to upconvert the frequency of a received digital television baseband signal to produce an RF multi-channel television spectrum for distribution. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

What is claimed is:

1. A digital upconversion system, comprising:
a digital frequency adjustment system configured to upward shift channel frequencies of a set of digital signals to produce a set of digital up-converted signals; and
a digital to analog conversion system coupled to said frequency adjustment system configured to convert the digital up-converted signals to analog signals.

2. The digital upconversion system of claim 1, further comprising a demultiplexer configured to receive and demultiplex the set of digital signals, wherein the output of said demultiplexer is coupled to the input of said digital frequency adjustment system.

3. The digital upconversion system of claim 1, further comprising an individual channel gain adjustment system configured to digitally adjust gain of individual channels coupled to the output of said digital frequency adjustment system.

4. The digital upconversion system of claim 1, wherein said digital frequency adjustment system further comprises:
a plurality of upsample elements, wherein each upsample element of said plurality of upsample elements is configured to receive a digital signal with a frequency and upsamples the digital signal;
a plurality of upconversion elements, wherein each of said plurality of upconversion elements is coupled to a corresponding upsample element within said plurality of upsample elements and is configured to upconvert a frequency of an upsampled digital signal; and
a first summing device coupled to each of the outputs of said plurality of upconversion elements is configured to produce an output signal.

5. The digital upconversion system of claim 4, wherein each upconversion element of said plurality of upconversion elements comprises:
a digital synthesizer configured to provide a local oscillation frequency; and a complex mixer configured to receive the local oscillation frequency and an upsampled signal produced by an upsample element within said plurality of upsample elements.

6. The digital upconversion system of claim 1, wherein said digital frequency adjustment system comprises:
a first plurality of upsample elements, wherein each upsample element of said first plurality of upsample elements is configured to receive a digital signal with a frequency and upsamples the digital signal;
a first plurality of upconversion elements, wherein each of said first plurality of upconversion elements is coupled to a corresponding upsample element within said first plurality of upsample elements and is configured to upconvert the frequency of an upsampled digital signal;
a first plurality of summing devices, wherein each summing device within said first plurality of summing devices is coupled to outputs from a set of upconversion elements within said first plurality of upconversion elements and is configured to produce an output signal;
a second plurality of upsample elements, wherein each of said second plurality of upsample elements is coupled to a corresponding output from a summing device within said first plurality of summing devices; and
a second plurality of upconversion elements, wherein each of said second plurality of upconversion elements is coupled to a corresponding upsample element within said second plurality of upsample elements and is configured to upconvert the frequency of an upsampled digital signal.

7. The digital conversion system of claim 6, further comprising a final summing device coupled to each of the outputs of said second plurality of upconversion elements and configured to produce an output signal.

8. The digital conversion system of claim 6, farther comprising a second plurality of summing devices, wherein each summing device within said second plurality of summing devices is coupled to outputs from a set of upconversion elements within said second plurality of upconversion elements and is configured to produce an output signal.

9. The digital upconversion system of claim 1, wherein said digital to analog conversion system comprises a digital to analog converter.

10. The digital upconversion system of claim 1, wherein said digital to analog conversion system comprises:
a plurality of digital to analog converters; and
a summing device coupled to the outputs of each of said plurality of digital to analog converters.

11. The digital upconversion system of claim 1, wherein said digital to analog conversion system comprises:
a plurality of digital to analog converters;
a plurality of filters, wherein each of said plurality of filters is coupled to a corresponding digital to analog converter within said plurality of digital to analog converters; and
a summing device coupled to the outputs of each of said plurality of filters.

12. A digital upconversion system, comprising:
a digital frequency adjustment system configured to upward shift channel frequencies of a set of digital signals to produce a set of digital up-converted signals; and
an analog frequency adjustment system coupled to said frequency adjustment system and configured to convert the digital up-converted signals to analog signals and further upshifting channel frequencies.

13. The digital upconversion system of claim 12, further comprising a demultiplexer configured to receive and demultiplex digital baseband television signals, wherein the output of said demultiplexer is coupled to the input of said digital frequency adjustment system.

14. The digital upconversion system of claim 12, wherein said digital frequency adjustment system further comprises:
a plurality of upsample elements, wherein each upsample element of said plurality of upsample elements is configured to receive a digital signal with a frequency and upsample the digital signal; and
a plurality of upconversion elements, wherein each of said plurality of upconversion elements is coupled to a corresponding upsample element within said plurality of upsample elements and is configured to upconvert the frequency of an upsampled digital signal.

15. The digital upconversion system of claim 14, wherein said digital frequency adjustment system further comprises:
a summing device coupled to each of the outputs of said plurality of upconversion elements and configured to produce an output signal.

16. The digital upconversion system of claim 12, wherein said analog frequency adjustment system further comprises:
a plurality of digital to analog converters;
a first plurality of bandpass filters, wherein an input of each bandpass filter within said first plurality of bandpass filters is coupled to a corresponding output of a digital to analog converter within said plurality of digital to analog converters;
a first plurality of mixers, wherein an input of each mixer within said first plurality of mixers is coupled to a corresponding output of a bandpass filter within said first plurality of bandpass filters;
a second plurality of bandpass filters, wherein an input of each of said second plurality of bandpass filters is coupled to a corresponding output of a mixer within said first plurality of mixers;
a second plurality of mixers, wherein an input of each of said second plurality of mixers is coupled to a corresponding output of a bandpass filter within said second plurality of bandpass filters; and
a plurality of low pass filters, wherein an input of each of said plurality of low pass filters is coupled to a corresponding output of a mixer within said second plurality of mixers.

17. A method for digital upconversion of digital signals, comprising:
(a) receiving a set of digital input signals;
(b) upsampling each of the digital input signals;
(c) upconverting each of the upsampled digital input signals;
(d) combining the signals produced in step (c) to produce a single output signal; and
(e) converting the signal produced in step (d) to an analog signal.

18. The method of claim 17, further comprising a step of demuxing an input signal to produce the set of digital input signals.

19. The method of claim 17, wherein step (d) further comprises conducting a series of cascaded steps of upsampling, upconverting, and combining the upsampled and upconverted digital input signals.

20. The method of claim 17, wherein step (e) comprises
(i) applying the signal produced in step (d) to a series of digital to analog converters; and
(ii) combining the signal outputs from step (i) into an output signal.

21. A method for digital upconversion of digital signals, comprising:
   (a) receiving a set of digital input signals;
   (b) partially upshifting the frequency of the received set of digital input signals within the digital domain;
   (c) converting the partially upshifted digital input signals to analog signals;
   (d) upshifting the frequency of signals produced in step (c) within the analog domain; and
   (e) combining the signals produced in step (d) to produce an output signal.

22. The method of claim 21, further comprising a step of demuxing an input signal to produce the set of digital input signals.

23. The method of claim 21, wherein step (c) further comprises:
   (i) upsampling each of the digital input signals;
   (ii) upconverting each of the upsampled digital input signals;
   (iii) combining the signals produced in step (ii) to produce one or partially upshifted digital input signals.

24. The method of claim 21, wherein step (d) further comprises:
   (i) converting the signals produced in step (c) to a set of analog signals;
   (ii) passing each of the signals within the set of analog signals through a bandpass filter with center frequency $f_0$ to produce a set of first intermediate signals;
   (iii) passing each of the first intermediate signals through a mixer to produce a set of second intermediate signals, wherein the frequency for each mixer is unique to each of the signals within the set of analog signals;
   (iv) passing each of the second intermediate signals through a bandpass filter with a center frequency equal to $f_0$ plus the frequency of the mixer that was used in step (ii) for the signal to produce a set of third intermediate signals; and
   (v) passing each of the third intermediate signals through a mixer with frequency $f_3$.

* * * * *

UNITED STATES PATENT AND TRADEMARK OFFICE
CERTIFICATE OF CORRECTION

| | | |
|---|---|---|
| PATENT NO. | : 8,111,183 B2 | Page 1 of 1 |
| APPLICATION NO. | : 12/805474 | |
| DATED | : February 7, 2012 | |
| INVENTOR(S) | : Gomez et al. | |

It is certified that error appears in the above-identified patent and that said Letters Patent is hereby corrected as shown below:

Column 9, line 36, please replace "farther" with --further--.

Signed and Sealed this
Tenth Day of April, 2012

David J. Kappos
*Director of the United States Patent and Trademark Office*